United States Patent Office 3,788,975
Patented Jan. 29, 1974

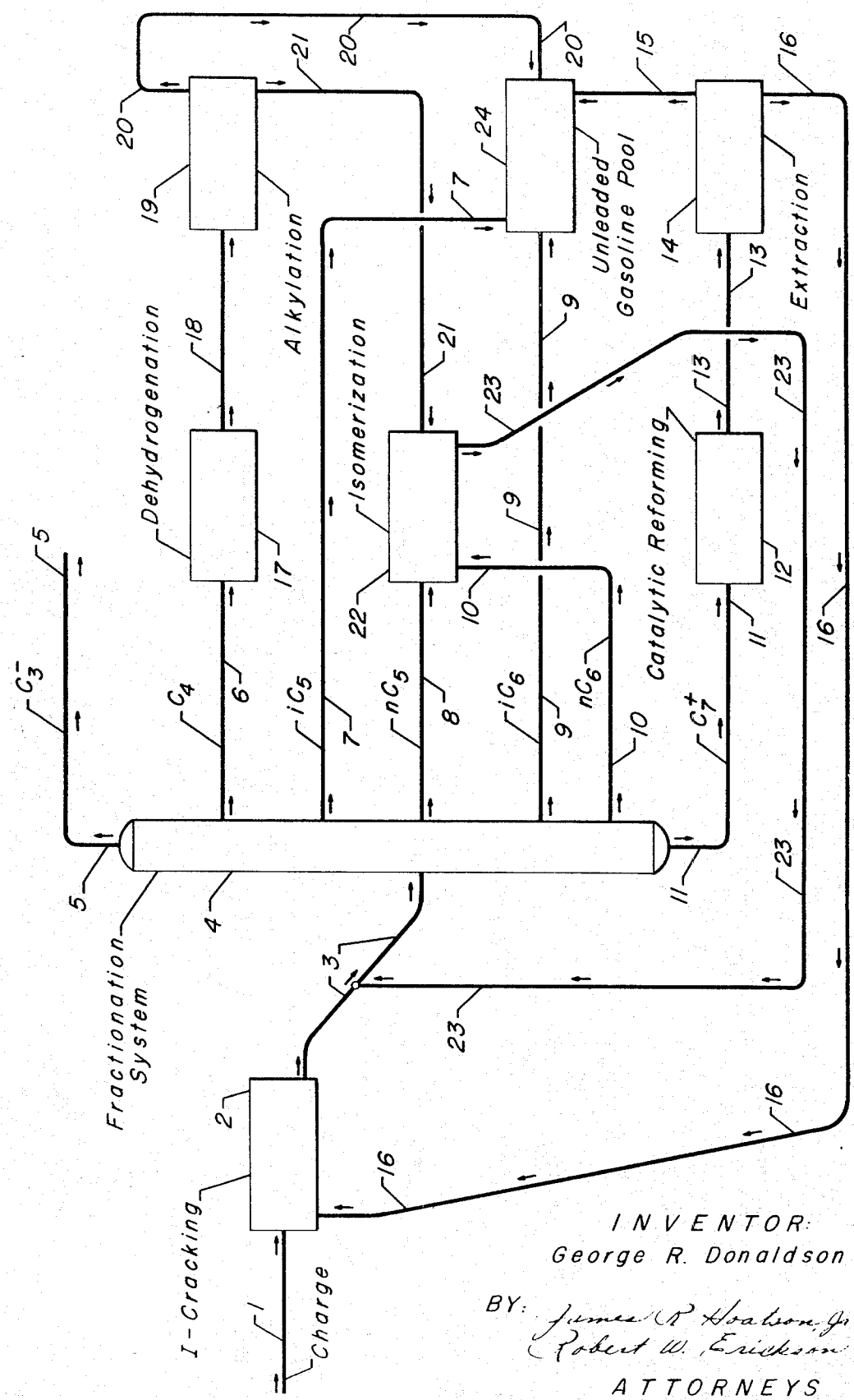

3,788,975
SIMULTANEOUS PRODUCTION OF AROMATIC
HYDROCARBONS AND ISOBUTANE
George R. Donaldson, Tower Lakes, Ill., assignor to
Universal Oil Products Company, Des Plaines, Ill.
Filed Sept. 30, 1971, Ser. No. 185,025
Int. Cl. C10g 37/10
U.S. Cl. 208—60                        4 Claims

ABSTRACT OF THE DISCLOSURE

A naphtha boiling range charge stock is converted into aromatic hydrocarbons and isobutane via a combination process involving hydrocracking, separation and catalytic reforming. The charge stock is initially subjected to a novel form of hydrocracking to produce a product predominantly comprising naphthenic hydrocarbons and highly branched paraffins, the majority of the latter being isobutane. Following separation to recover the isobutane and to provide a heptane-plus normally liquid stream, catalytic reforming is utilized to dehydrogenate the naphthenic compounds in the latter to produce an aromatic concentrate.

APPLICABILITY OF INVENTION

The present invention involves a multiple-stage process for the conversion of naphtha, or gasoline boiling range hydrocarbons, to produce an aromatic concentrate and large quantities of isobutane. More specifically, the inventive concept herein described is directed toward an integrated refinery process for producing a high octane, unleaded motor fuel gasoline pool.

Aromatic hydrocarbons, principally benzene, toluene, ethylbenzene and the various xylene isomers, are required in large quantities to satisfy an ever-increasing demand for various petrochemicals. For example, benzene may be dehydrogenated to cyclohexane for use in the manufacture of nylon; toluene is often used as a solvent and as the starting material for various medicines, dyes, perfumes, etc. A principal utilization of aromatic hydrocarbons is as gasoline blending components in view of their exceedingly high research octane blending values. For example, benzene has a clear research octane blending value of 99, while toluene and all other aromatics have a value in excess of 100. Isobutane finds widespread use in organic synthesis, as a refrigerant and as an aerosol propellant, etc. Other uses include conversion to isobutenes for use in the production of butyl rubber, copolymer resins with butadiene, acrylonitrile, etc. In accordance with one embodiment of the present invention, the multiple-stage process for producing an aromatic concentrate and isobutane is integrated into an overall refinery scheme for the production of a high octane, unleaded gasoline pool. The aromatic concentrate is sent directly to the unleaded gasoline pool while the isobutane concentrate is subjected to alkylation, with an olefinic hydrocarbon, the normally liquid alkylate product being recovered as a part of the gasoline pool.

Relatively recent investigations into the causes and cures of environmental pollution have shown that more than half of the violence to the atmosphere stems from vehicular exhaust and consists primarily of unburned hydrocarbons and carbon monoxide. These investigations have brought about the development of catalytic converters which, when installed within the automotive exhaust system, are capable of converting more than 90.0% of the noxious components into innocuous material. In developing these catalytic converters, it was learned that the efficiency of conversion and the stability of the selected catalytic composite were severely impaired when the exhaust fumes resulted from the combustion of lead-containing motor fuels. Compared to operation of the catalytic converter during the combustion of clear, unleaded gasoline, both the conversion of noxious components and the stability of the catalytic composite decreased as much as 50.0%. Therefore, it has been recognized throughout the petroleum industry, as well as in the major gasoline-consuming countries, that suitable gasoline must be produced for ultimate consumption in current internal combustion engines without requiring the addition of lead to increase the octane rating and thereby enhance the anti-knock properties thereof. Also being recognized is the fact that unburned hydrocarbons and carbon monoxide are not the only extremely dangerous pollutants being discharged via vehicular exhaust. Japan has recently experienced an increase in the incidence of lead poisoning, and has enacted legislation to reduce significantly the quantity of lead in motor fuel gasolines.

One natural consequence of the removal of lead from motor fuel gasoline, in addition to many others, resides in the fact that petroleum refining operations will necessitate modification in order to produce voluminous quantities of high octane, unleaded motor fuels in an economically attractive fashion. One well-known, and well-documented refining process, capable of significantly improving the octane rating of naphtha boiling range fractions, is the catalytic reforming process. In such a process, the principal octane-improving reactions are naphthene dehydrogenation, naphthene dehydroisomerization, paraffin dehydrocyclization and paraffin hydrocracking. Naphthene dehydrogenation is extremely rapid, and constitutes the principal octane-improving reaction. With respect to a five-membered ring alkyl naphthene, it is necessary first to effect isomerization to produce a six-membered ring naphthene, followed by the hydrogenation to an aromatic hydrocarbon. Paraffin aromatization is achieved through dehydrocyclization of straight-chain paraffins having at least six carbon atoms per molecule. Paraffin aromatization is limited in view of the fact that the aromatic concentration increases as the charge stock traverses the reforming reaction zones, thereby decreasing the rate of additional dehydrocyclization. Unreacted, relatively low octane paraffins, therefore, are present in the reformed product effluent and effectively reduce the overall octane rating thereof. These components are currently tolerated because their lead susceptibility is relatively high.

When operating at a relatively high severity, the paraffinic hydrocarbons within the reforming reaction zone are subjected to cracking. Although this partially increases the octane rating of the gasoline boiling range product, substantial quantities of normally gaseous material are produced. Since hydrogen is present within the reaction zone, the light gaseous material is substantially completely saturated and comprises methane, ethane, propane and butane. At a relatively low reforming severity, paraffin cracking is decreased with the result that an increased quantity of low octane rating saturates is produced. In order to upgrade the overall quality of the gasoline pool, either the addition of lead becomes necessary, or the low octane rating saturates must be subjected to further processing to produce higher octane components. As previously stated, aditional processing of the saturates can be eliminated by increasing the operating severity within the catalytic reforming reaction zone. This type of operation produces a two-fold effect, notwithstanding an increase in the octane rating of the final products; first, additional high octane aromatic components are produced and, secondly, the low octane rating components are at least partially eliminated by conversion either to aromatic hydrocarbons or to light normally gaseous material. Therefore, the results include lower liquid yield of gasoline due both to "shrinkage" in molecular size when paraffins and naphthenes are converted to aromatics, and to the production of the aforesaid light gaseous components. These problems are further compounded when the desired end result is the production of a high octane, unleaded gasoline pool. In accordance with one overall refinery operation, into which the present invention is integrated, a particular hydrocracking system is dove-tailed with at least a separation system, a catalytic reforming unit and an alkylation unit. As hereinafter indicated, the end result is the production of a high octane, unleaded gasoline pool, unaccompanied by substantial liquid yield loss.

Hydrocarbonaceous charge stocks, contemplated for conversion in accordance with the present invention, constitute naphtha boiling range hydrocarbon fractions and/or distillates. "Gasoline boiling range hydrocarbons" generally connotes those hydrocarbons having an initial boiling point of at least 100° F., and an end boiling point less than about 450° F., and is inclusive of intermediate boiling range fractions often referred to in the art "light naphtha" and "heavy naphtha." It is not intended to limit the present invention to a charge stock having a particular boiling range. Suffice to say, a suitable charge stock will generally have an initial boiling point above about 100° F. and an end boiling point below about 450° F. The charge stock is reduced in boiling range, while maintaining the ring structure and the eventual aromatic yields, during the selective hydrocracking step. Consequently, charge stocks of substantially higher boiling range may be successfully processed to yield a suitable boiling range naphthene concentrate for catalytic reforming. The precise boiling range of any given naphtha fraction will be dependent upon the economic and processing considerations prevalent in the particular locale where the charge stock is available. The key feature of the present invention is a particular hydrocracking reaction zone wherein the fresh feed charge stock is initially processed to convert the paraffinic hydrocarbons into exceedingly high yields of isobutane.

OBJECTS AND EMBODIMENTS

A principal object of the present invention is the simultaneous production of aromatic hydrocarbons and an isobutane concentrate. A corollary objective resides in the production of a high-octane, unleaded motor fuel gasoline pool.

Another object of my invention is to provide an integrated refinery operation for producing high liquid yields of a high octane, unleaded gasoline pool.

Therefore, in one embodiment, the present invention involves a process for the simultaneous production of an aromatic concentrate and isobutane, from a naphtha boiling range charge stock, which process comprises the steps of: (a) reacting said charge stock and hydrogen, in a hydrocracking reaction zone, at hydrocracking conditions and in contact with a hydrocracking catalytic composite of a Group VIII noble metal component, or a nickel component, and the reaction product of alumina and a sublimed Friedel-Crafts metal halide; (b) separating the resulting hydrocracked product effluent, in a first separation zone, to recover said isobutane and to provide a heptane-plus concentrate; and (c) reacting said heptane-plus concentrate in a catalytic reforming reaction zone, at reforming conditions selected to convert naphthenic hydrocarbons to aromatic hydrocarbons.

Other embodiments of my invention involve the use of various catalytic composites, operating conditions and processing techniques. In one such other embodiment, the first separation zone provides a pentane-hexane concentrate which is reacted with hydrogen in a hydroisomerization reaction zone at conditions selected to produce pentane and hexane isomers, said isomers being recovered as part of an unleaded, high octane gasoline pool.

In a limited embodiment, the present inventive concept is directed toward a process for the production of a high octane, unleaded gasoline pool which comprises the steps of: (a) reacting a naphtha boiling range charge stock, in a hydrocracking reaction zone, at hydrocracking conditions and in contact with a hydrocracking catalytic composite of a Group VIII noble metal component, or a nickel component, and the reaction product of alumina and a sublimed Friedel-Crafts metal halide; (b) separating the resulting hydrocracked product effluent, in a first separation zone, to provide (1) an isobutane concentrate, (2) a pentane-hexane concentrate, and (3) a heptane-plus concentrate; (c) reacting said heptane-plus concentrate in a catalytic reforming reaction zone, at reforming conditions selected to convert naphthenic hydrocarbons to aromatic hydrocarbons; (d) alkylating said isobutane concentrate with an olefinic hydrocarbon, in an alkylation reaction zone, at alkylating conditions selected to produce a normally liquid alkylated hydrocarbon stream; and (e) recovering said aromatic hydrocarbons and said alkylated hydrocarbon stream as said high octane, unleaded gasoline pool.

In still another embodiment, at least a portion of the isobutane concentrate is reacted in a dehydrogenation reaction zone, at dehydrogenation conditions selected to produce isobutenes which are reacted in said alkylation reaction zone as said olefinic hydrocarbons.

SUMMARY OF INVENTION

As hereinbefore set forth, the present invention involves a particular saturate cracking zone, a separation zone and a catalytic reforming zone. Additionally, in another embodiment, an integrated refinery scheme, incorporating the present inventive concept, utilize a solvent extraction zone, an isomerization reaction zone and an alkylation reaction zone. In a specific embodiment, the overall refinery process includes a dehydrogenation reaction zone to produce the olefinic hydrocarbons utilized in the alkylation reaction zone. In order that a clear understanding of the integrated refinery process is obtained, a brief description of each of the various reaction and separation zones, utilized in one or more embodiments, is believed to be warranted. In describing each individual zone, one or more references will be made to U.S. patents in order that more details will be readily available where desired. Such references, however, are not to be construed as exhaustive or limiting, but merely exemplary and illustrative.

HYDROCRACKING REACTION ZONE

The naphtha boiling range charge stock to the hydrocracking reaction zone may be derived from a multitude of sources. For example, one source constitutes those naphtha distillates derived from full boiling range petroleum crude oils; another source is the naphtha fraction obtained from the catalytic cracking of gas oil, while another source constitutes the gasoline boiling range effluent from a hydrocracking reaction zone processing heavier-than-gasoline charge stock. In view of the fact that the greater proportion of such naphtha fractions are contaminated through the inclusion of sulfurous and nitrogenous compounds, it is contemplated that the hydrocracking reaction zone may have integrated therein a hydrorefining zone, complete details of which are well known and thoroughly described in the prior art. It is understood that such pretreatment of the naphtha charge stock is not an essential feature of the present process.

As hereinbefore set forth, a key feature of the present inventive concept is the particular hydrocracking reaction zone. This hydrocracking reaction zone is unlike present-day hydrocracking processes both in function and result. Initially, the charge to the hydrocracking reaction zone constitutes the naphtha boiling range charge stock, and the product effluent contains very little, if any, methane and ethane. In those instances where the product effluent contains propane, the same can be recovered and subsequently utilized for alkylation or isopropyl alcohol production. Through the utilization of a particular catalytic composite and operating conditions, the cracking of paraffinic hydrocarbons in the charge stock produces relatively large quantities of butanes, which butane concentrate is rich in isobutane. Similarly, virgin pentanes and hexanes are converted to the various isomers thereof. In view of the unique character of the product effluent, being exceedingly rich in isoparaffins, and particularly in isobutane, the present hydrocracking reaction zone is referred to herein as "I-cracking." The selective nature of the hydrocracking reactions taking place include the retention of cyclic rings and the reduction in molecular weight of these rings via isomerization and the splitting of isobutane from the parent molecule. Thus, cyclic compounds boiling in the higher temperature range of the feed stock are converted to lower-boiling naphthenes which are, in turn, converted into gasoline boiling range aromatics in the subsequent catalytic reforming reaction zone. Beneficial effects are thus afforded since high octane aromatics are more uniformly distributed throughout the final gasoline boiling range. With respect to increasing the yield of normally liquid hydrocarbons in the unleaded gasoline pool, the butane concentrate can be subjected to alkylation with suitable olefinic hydrocarbons.

The hydrocracking reaction conditions, under which the process is conducted, will vary according to the chemical and physical characteristics of charge stock. In the past, hydrocracking reactions were generally effected at pressures in the range of about 1,500 to about 5,000 p.s.i.g., a liquid hourly space velocity of about 0.25 to about 5.0, hydrogen circulation rates of about 5,000 to about 50,000 s.c.f./bbl. and maximum catalyst bed temperatures in the range of about 700° F. to about 950° F. As discussed in the prior art, heavier charge stocks require a relatively high severity of operation including high pressures, high catalyst bed temperatures, and relatively low liquid hourly space velocities. A lower severity of operation is employed with comparatively lighter feed stocks such as the kerosenes and light gas oils. In accordance with the present invention, regardless of the characteristics of the naphtha boiling range charge stock, the hydrocracking process is effected at a relatively lower severity than those now commonly in use. The hydrocracking reaction zone has disposed therein a catalytic comprising a Group VIII noble metal component, or a nickel component, and the reaction product of alumina and a sublimed Friedel-Crafts metal halide. The conversion conditions include a liquid hourly space velocity of about 0.5 to about 10.0, a hydrogen-circulation rate of about 3,000 to about 20,000 s.c.f./bbl., a pressure from about 200 to about 2,000 p.s.i.g., and preferably from about 500 p.s.i.g. to 1,000 p.s.i.g. and, of greater significance, a maximum catalyst bed temperature from about 300° F. to about 650° F. In many instances the operating pressure will consistently be in the range of about 200 to about 500 p.s.i.g., the hydrogen concentration from about 3,000 to about 10,000 s.c.f./bbl. and the liquid hourly space velocity from about 2.0 to about 10.0 without inducing serious effects either in regard to the effective life of the catalytic composite, or with respect to the desired product slate.

As hereinbefore set forth, the hydrocracking reaction zone utilizes a catalytic composite containing a Group VIII noble metal component, or a nickel component, and the reaction product of alumina and a sublimed Friedel-Crafts metal halide. Thus, where the metal halide is, for example, aluminum chloride, the catalyst is characterized by the following group:

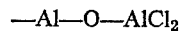

—Al—O—AlCl$_2$

Considering first the porous material, serving as the carrier for the catalytically active metallic components, it is preferred that it be adsorptive and possess a high surface area from about 25 to about 500 square meters per gram. Heretofore, suitable carrier materials have been selected from the group of amorphous refractory inorganic oxides including alumina, titania, zirconia, silica, mixtures thereof, etc. When of the amorphous type, the preferred prior art carrier material appears to be a composite of alumina and silica, with the latter being present in an amount of about 10.0% to about 90.0% by weight. Recent developments in the area of catalysis have further shown that various crystalline aluminosilicates can be employed to advantage in some hydrocracking situations. Such zeolitic material includes mordenite, faujasite, Type A or Type U molecular sieves, etc.

In view of the fact that a sublimed Friedel-Crafts metal halide is not sufficiently strong to react with silica, to form the type of group hereinbefore described, the preferred carrier material constitutes alumina. While the action and effect of the sublimed metal halide on refractory material other than alumina and silica, for example zirconia, is not known with accuracy, it is believed that reaction does not take place to a degree sufficient to produce the desired catalyst and result.

The hydrocracking catalytic composite contains a Group VIII noble metal component, or a nickel component. Suitable metals are those from the group including platinum, palladium, rhodium, ruthenium, osmium, iridium and nickel. Iron and cobalt components do not appear to possess the propensity for effecting the desired degree of hydrocracking, and are, therefore, excluded from the group of suitable metallic components. A particularly preferred catalytic composite contains a platinum, palladium or nickel component. These metal components, for example platinum, may exist within the final composite as a compound such as an oxide, sulfide, halide, etc., or in an elemental state. Generally, the amount of the noble metal component is small compared to the quantities of the other components which are combined therewith. Calculated on an elemental basis, the noble metal component comprises from about 0.01% to about 2.0% by weight of the final catalytic composite. With respect to the nickel component, again calculated on the basis of the elemental metal, it will be present within the catalytic composite in an amount from about 1.0% to about 10.0% by weight.

The metallic components may be incorporated within the catalytic composite in any suitable manner including coprecipitation or co-gelation with the carrier material, ion-exchange or impregnation. The latter constitutes a preferred method of preparation, and utilizes water-soluble compounds of the metallic components. Thus, a platinum component may be added to a carrier material by commingling the latter with an aqueous solution of chloroplatinic acid. Other water-soluble compounds may be employed, and include ammonium chloroplatinate, platinum chloride, chloropalladic acid, palladic chloride, nickel nitrate hexahydrate, etc. Following impregnation, the carrier material is dried and subjected to a calcination, or oxidation technique which is generally followed by reduction in hydrogen at an elevated temperature. An essential ingredient of the hydrocracking catalyst is a Friedel-Crafts metal halide which, when sublimed, combines with the alumina by way of reaction therewith to produce the group hereinbefore described. The method of incorporating the Friedel-Crafts metal halide involves a sublimation, or vaporization technique, with the vaporized metal halide contacting the alumina containing the Group VIII noble metal component or the nickel component. That is, the catalytically active metallic component is composited with the alumina before the latter is contacted with the sublimed metal halide. Briefly, therefore, the preferred technique involves the incorporation of the Friedel-Crafts metal halide after the catalytically active metal components have been impregnated onto the carrier material, and following drying, calcination and reduction in hydrogen. The metal halide is vaporized onto the carrier, and heated to a temperature of about 300° C.

for a time sufficient to remove any unreacted metal halide. Thus, the final catalytic composite does not contain any free Friedel-Crafts metal halide. Following vaporization of the metal halide, and heating of the thus-formed composite, the refractory inorganic oxide will be increased in weight by from about 2.0% to about 25.0% based upon the original weight of the carrier material. While the exact increased weight does not appear to be critical, high activity catalysts are obtained when the thus-treated refractory material has a weight increase of about 5.0% to about 20.0%. On the basis of the quantity of a metal halide combined therewith, the treated carrier material will contain from about 1.96% to about 20.0% by weight of the metal halide, and preferably from about 4.76% to about 16.67% by weight, as the metal halide. Further details of this sublimation technique may be found in U.S. Pat. No. 2,924,628 (Cl. 260–666). Since the desired group, as hereinbefore set forth, is sensitive to moisture, the sublimation technique is effected after the Group VIII noble metal component or nickel component has been combined with the alumina.

Various Friedel-Crafts metal halides may be utilized, but not necessarily with equivalent results. Examples of such metal halides include aluminum bromide, aluminum chloride, antimony pentachloride, beryllium chloride, germanium tetrachloride, ferric chloride, ferric bromide, gallium trichloride, stannic bromide, stannic chloride, titanium tetrabromide, titanium tetrachloride, zinc bromide, zinc chloride, and zirconia chloride. The Friedel-Crafts aluminum halides are preferred, with aluminum chloride and/or aluminum fluoride being particularly preferred. This is due to the ease of preparation and the fact that the thus-prepared catalysts have an unexpectedly high activity for the selective production of isoparaffins, and particularly isobutane.

Temperatures at which the Friedel-Crafts metal halide is vaporized onto the alumina will vary in accordance with the particular metal halide utilized. In most instances, the vaporization is carried out either at the boiling or sublimation point of the particular Friedel-Crafts metal halide, or at a temperature not substantially exceeding these points; for example, not greater than about 100° C. higher than the boiling point or sublimation point. In effecting one catalyst preparation, the amorphous carrier material has aluminum chloride sublimed thereupon. Aluminum chloride sublimes at a temperature of about 178° C. and a suitable vaporization temperature will, therefore, range from about 180° C. to about 275° C. The sublimation technique may be carried out under pressure, and in the presence of diluents such as inert gases. Although the particularly preferred technique involves the sublimation of a metal halide directly to react with the alumina, the reaction product may result from a halide-containing compound which initially reacts with the alumina to form aluminum halide which, in turn, reacts with additional alumina thereby forming groups of —Al—O—AlCl$_2$. Such halide-containing compounds include carbon tetrachloride, sulfur dichloride, sulfur oxydichloride, PCl$_3$, POCl$_3$, etc.

Prior to its use, the catalytic composite may be subjected to a substantially water-free reduction technique. This is designed to insure a more uniform and thorough dispersion of the metallic components throughout the carrier material. Substantially pure and dry hydrogen is employed as the reducing agent at a temperature of about 800° F. to about 1200° F., and for a time sufficient to reduce the metallic components.

In view of the fact that the reactions being effected are exothermic in nature, an increasing temperature gradient is experienced as the hydrogen and charge stock traverse the catalyst bed. In accordance with the present process, the maximum catalyst bed temperature, virtually the same as that measured at the outlet of the reaction zone, is maintained in the range of about 350° F. to about 650° F. In order to assure that the catalyst bed temperature does not exceed the maximum allowable, the use of conventional quench streams, either normally liquid, or normally gaseous and introduced at one or more intermediate loci of the catalyst bed, is contemplated.

As hereinbefore set forth, the product effluent from the hydrocracking reaction zone is predominantly butane, the greater proportion of which constitutes isobutane. For this reason, the hydrocracking reaction zone is herein referred to as "I-cracking," the "I" alluding to isomer production.

In addition to the production of exceedingly large quantities of isobutane, accompanied by little yield loss to methane and ethane, an unusual and unexpected result is the virtually complete retention of cyclic hydrocarbons, both aromatic and naphthenic, originally present in the fresh feed charge stock. Furthermore, the retained cyclic hydrocarbons appear to have been reduced in the boiling range with the result that the subsequent reformed product effluent exhibits a more uniform distribution of the high octane components. This is important from the standpoint of the possible lowering of motor fuel end boiling point at some future time.

The foregoing is evidenced by the results of I-cracking a Mid-Continent straight-run naphtha having the characteristics illustrated in the following Table I.

TABLE I

Mid-Continent naphtha charge properties

| | |
|---|---|
| Gravity, ° API | 55.0 |
| ASTM distillation, ° F.: | |
| IBP | 210 |
| 5% | 226 |
| 10% | 230 |
| 30% | 244 |
| 50% | 262 |
| 70% | 286 |
| 90% | 318 |
| 95% | 330 |
| EP | 369 |
| Cyclics, wt. percent | 52.6 |
| Aromatics, vol. percent | 10.1 |

The I-cracking yields, being based on weight percent of the naphtha charge stock, and selectivities of conversion, are presented in the following Table II.

TABLE II

I-cracking yields and selectivities

| Stream: | Wt. percent |
|---|---|
| Butanes-minus | 21.2 |
| Pentanes | 11.7 |
| Hexanes | 11.9 |
| Heptane-plus | 56.5 |
| Hydrogen consumed | 1.3 |

| Selectivities: | Percent |
|---|---|
| Butane/butane-minus | 92.0 |
| Isobutene/butanes | 92.0 |
| Isopentane/pentanes | 89.0 |
| Cyclics in heptane-plus | 76.0 |
| Cyclic retention, molar | 99.0 |

As hereinafter indicated in greater detail, the heptane-plus portion of the hydrocracked product effluent is subjected to a catalytic reforming reaction zone. One typical reformed product effluent contains 84.5% by volume of aromatic hydrocarbons and has a clear research octane rating of 105.4 with respect to the pentane-plus portion.

The overall yields, considering only the hydrocracking and catalytic reforming reaction zones, indicates a butane-plus product in an amount of 101.2 vol. percent, based upon the naphtha charge stock. This product stream has a clear research octane rating of 98.9, and is produced with an accompanying yield loss to methane, ethane and propane of only 4.0% by weight.

As hereinbefore stated, the selective hydrocracking operation also has an effect on the boiling range of the aromatics produced in the subsequent catalytic reforming step. The following Table III indicates a comparison between the product produced by a direct catalytic reforming of the Mid-Continent charge stock and the material which results from hydrocracking the naphtha followed by catalytically reforming the heptane-plus portion of the hydrocracked product. The front end cannot be compared directly since the product from the hydrocracking operation does not include pentane/hexane portion. However, it will be noted that the last 50.0 vol. percent definitely indicates a lower boiling range to the extent that there is a 40° difference in end point; the end point is, in fact, lower than that of the original Mid-Continent feed stock.

TABLE III.—PRODUCT COMPARISON

| Product | Reforming | I-cracking/ reforming |
|---|---|---|
| Gravity, ° API | 43.2 | 36.5 |
| 100 ml. ASTM distillation, ° F.: | | |
| IBP | 144 | 162 |
| 5% | 190 | 204 |
| 10% | 208 | 218 |
| 30% | 246 | 246 |
| 50% | 272 | 264 |
| 70% | 302 | 284 |
| 90% | 344 | 312 |
| 95% | 362 | 324 |
| EP | 404 | 358 |
| Aromatics, vol. percent | 61.8 | 84.5 |
| Clear octane rating | 96.3 | 105.4 |

CATALYTIC REFORMING ZONE

The product effluent from the I-cracking reaction zone is separated, in suitable fractionation facilities, into various component streams. A butane concentrate, consisting predominantly of isobutane, is subjected to either alkylation or dehydrogenation as hereinafter set forth. Isopentane and isohexane are separately recovered and may be introduced directly into the unleaded gasoline pool in view of their high octane blending values. In a preferred embodiment, the normal pentane and normal hexane are subjected to isomerization to produce additional pentane/hexane isomers. The heptane-plus portion of the I-cracking product effluent constitutes the charge to the catalytic reforming reaction zone.

Catalytic composites, suitable for utilization in the reforming reaction zone, generally comprise a refractory inorganic oxide carrier material containing a metallic component generally selected from the noble metals of Group VIII. Recent developments in the area of catalytic reforming have indicated that catalyst activity and stability are significantly enhanced through the addition of various catalytic modifiers, especially tin, rhenium, nickel and/or germanium.

Suitable porous carrier materials include refractory inorganic oxides such as alumina, silica, zirconia, etc., and crystalline aluminosilicates, such as the faujasites, or mordenite, or combinations of alumina and/or silica with the various crystalline aluminosilicates. Generally favored metallic components include ruthenium, rhodium, palladium, osmium, rhenium, platinum, iridium, germanium, nickel and tin. These metallic components are employed in concentrations ranging from about 0.01% to about 5.0% by weight, and preferably from about 0.01% to about 2.0% by weight. Reforming catalysts may also contain combined halogen selected from the group of chlorine, fluorine, bromine, iodine and mixtures thereof.

Illustrative catalytic reforming processes are found in U.S. Pats. 2,905,620 (Cl. 208—65), 3,000,812 (Cl. 208—138) and 3,296,118 (Cl. 208—100). Effective reforming operating conditions include catalyst temperatures within the range of about 800° F. to about 1100° F., preferably having an upper limit of about 1050° F. The liquid hourly space velocity, defined as volumes of hydrocarbon charge per hour per volume of catalyst disposed within the reforming reaction zone, is preferably within the range of about 1.0 to about 5.0, although space velocities from about 0.5 to about 15.0 may be employed. The quantity of hydrogen-rich gas, in admixture with the hydrocarbon feed stock, is generally from about 1.0 to about 20.0 moles of hydrogen per mole of hydrocarbon. The reforming reaction zone effluent is generally introduced into a high-pressure separation zone at a temperature of about 60° F. to about 140° F., to separate lighter components from heavier, normally liquid components. Since normal reforming operations produce large quantities of hydrogen, a certain amount of recycle gaseous stream is generally removed from a reforming system by way of pressure control. It is within the scope of the present invention that such excess hydrogen be employed in the hydrogen-consuming hydrocracking reaction zone as make-up hydrogen, as well as in the hydroisomerization reaction zone. Pressures in the range of about 100 to about 1,500 p.s.i.g. are suitable for effecting catalytic reforming reactions.

AROMATIC SEPARATION ZONE

As hereinbefore set forth, the catalytic reforming zone is maintained at relatively low-severity operating conditions in order to produce a product effluent rich in aromatic hydrocarbons. Although the entire normally liquid portion of the reforming zone effluent, including the aromatics, may be introduced into the aromatic separation zone, a preferred technique involves initially separating the reformed product effluent to recover a hexane-minus stream which is introduced into the fractionation system for separation therein.

Although any aromatic separation scheme may be utilized, a greater degree of efficiency is achieved through the use of a solvent extraction system. Solvent extraction, to produce an aromatic concentrate and a paraffinic raffinate, is a well-known technique which is thoroughly decribed in the literature. Suitable techniques involve the operations illustrated in U.S. Pats. 2,730,558 (Cl. 260—674) and 3,361,664 (Cl. 208—313). Solvent extraction processes utilize a solvent having a greater selectivity and solvency for the aromatic components of the reformed product effluent than for the paraffinic components thereof. Selective solvents may be selected from a wide variety of normally liquid organic compounds of generally polar character; that is, compounds containing a polar radical. The particular solvent is one which boils at a temperature of about the boiling point of the hydrocarbon mixture at ambient extraction pressure. Illustrative specific organic compounds, useful as selective solvents in extraction processes for the recovery of aromatic hydrocarbons, include the alcohols, such as the glycols, including ethylene glycol, propylene glycol, butylene glycol, tetra-ethylene glycol, glycerol, diethylene glycol, dipropylene glycol, dimethyl-ether of ethylene glycol, triethylene glycol, tripropylene glycol, etc.; other organic solvents well known in the art, for extraction of hydrocarbon components from mixtures thereof with other hydrocarbons may be employed. A particularly preferred class of solvents are those characterized as the sulfolane-type. Thus, as indicated in U.S. Pat. No. 3,470,087 (Cl. 208—321), the preferred solvent is one having a five-membered ring, one atom of which is sulfur, the other four being carbon and having two oxygen atoms bonded to the sulfur atoms. In addition to sulfolane, the preferred class includes the sulfolenes, such as 2-sulfolene, and 3-sulfolene.

The aromatic selectivity of the preferred solvents may be further enhanced through the addition of water. This increases the selectivity of the solvent phase for aromatic hydrocarbons over non-aromatic hydrocarbons without reducing substantially the solubility of the solvent phase for aromatic hydrocarbons. In general, the solvent composition contains from about 0.5% to about 20.0% by weight of water, and preferably from about 2.0% to about 15.0% by weight, depending principally on the particular solvent and the process conditions under which extraction, extractive distillation and solvent recovery zones are operated.

In general, solvent extraction is conducted at elevated temperatures and pressures selected to maintain the charge stock and solvent in a liquid phase. Suitable temperatures are within the range of about 80° F. to about 400° F., and preferably from about 150° F. to about 300° F. Operating pressures include superatmospheric pressures upto about 400 p.s.i.g. and preferably from about 15.0 p.s.i.g. to about 150 p.s.i.g.

Typical extractive distillation zone pressures are from atmospheric to about 100 p.s.i.g., although the pressure at the top of the distillation zone will generally be maintained in the range of about 1 p.s.i.g. to about 20 p.s.i.g. The reboiler temperature is dependent upon the composition of the feed stock and the selected solvent, although temperatures from about 275° F. to about 360° F. appear to yield satisfactory results. The solvent recovery system is operated at low pressures and sufficiently high temperatures to drive the aromatic hydrocarbons overhead, thus producing a lean solvent bottoms stream. Preferably, the top of the solvent recovery zone is maintained at a pressure from about 100 to about 400 mm. of mercury absolute. These low pressures must be used since the reboiler temperatures should be maintained below about 370° F. in order to avoid thermal decomposition of the organic solvent.

ALKYLATION REACTION ZONE

Since the preferred use of the present inventive concept is the integration thereof into an overall refinery scheme for the production of a high octane, unleaded motor fuel gasoline pool, the isobutane-rich effluent from the I-cracking zone is utilized as fresh feed to an alkylation reaction zone. Alkylation is effected by intimately commingling the isobutane feed, olefinic hydrocarbons and a particular catalyst as hereinafter described. It is understood that the particular source of the olefinic hydrocarbon, for utilization in the alkylation reaction zone, is not essential to the process encompassed by the present invention. Thus, "outside" olefinic material may be brought into the described process from any suitable source such as a fluid catalytic cracking unit, or a thermal cracking unit. However, as stated in another specific embodiment of the present invention, at least a portion of the isobutane concentrate may be subjected to dehydrogenation in a dehydrogenation reaction zone to produce the alkylatable olefinic hydrocarbons. In another embodiment, the propane/butane concentrate, obtained by the separation of the catalytic reformed product effluent, may also be dehydrogenated and introduced into the alkylation reaction zone.

The alkylation reaction zone may be any acidic catalyst reaction system such as a hydrogen fluoride-catalyzed system, or one which utilizes a boron halide and a fixed-bed reaction system. Hydrogen fluoride alkylation is particularly preferred, and may be conducted substantially as set forth in U.S. Pat. No. 3,249,650 (Cl. 260–683.48). Briefly, the alkylation conditions, when effected in the presence of hydrogen fluoride catalyst, are such that the catalyst to hydrocarbon volume ratio within the alkylation reaction zone is in the range of about 0.5 to about 2.5. Ordinarily, anhydrous hydrogen fluoride will be charged to the alkylation system as fresh catalyst; however, it is possible to utilize hydrogen fluoride containing as much as about 10.0% water. Excessive dilution with water is generally avoided since it tends to reduce the alkylating activity of the catalyst and further introduces a variety of corrosion problems into the process. In order to reduce the tendency of the olefinic portion of the charge stock to undergo polymerization prior to alkylation, the molar proportion of isoparaffins to olefinic hydrocarbons within the alkylation reaction zone is desirably maintained at a value greater than 1.0, and preferably from about 3.0 to about 15.0. Alkylation reaction conditions, when catalyzed by hydrogen fluoride, include a temperature from 0° to about 200° F., and preferably from about 30° F. to about 125° F. The pressure maintained within the alkylation system is ordinarily at a level sufficient to maintain the hydrocarbons and catalyst in substantially liquid phase; that is, from about atmospheric to about 40 atmospheres. The contact time within the alkylation reaction zone is conveniently expressed in terms of space-time, and is defined as the volume of catalyst within the contact zone divided by the volume rate per minute of hydrocarbon reactants charged to the zone. Usually the space-time factor will be less than 30 minutes and preferably less than about 15 minutes.

The alkylation reaction zone effluent is separated to provide an acid phase and a hydrocarbon phase, the latter being separated to recover the normally liquid alkylate product and unreacted isobutane. The alkylate product, in combination with the aromatic concentrate from the solvent extraction zone forms part of the unleaded gasoline pool. Unreacted isobutane and olefinic hydrocarbons, if any, may be recycled to the alkylation reaction zone, or a portion thereof may be diverted to the dehydrogenation reaction zone for the purpose of producing additional olefinic hydrocarbons for utilization in the alkylation reaction zone.

ISOMERIZATION REACTION ZONE

As previously indicated, a significant quantity of pentanes and hexanes are produced in both the I-cracking and catalytic reforming reaction zone. Additionally, in those instances where the fresh feed charge stock to the process is a full boiling range naphtha distillate, the same may contain a pentane/hexane concentrate. In view of the fact that normal pentane has a clear research octane rating of about 62, and normal hexane a clear research octane rating of 25, these components are not desirable in a gasoline pool which is intended to be free from lead additives.

In still another embodiment of the present invention, therefore, a normal pentane/normal hexane stream is separately recovered and introduced into an isomerization reaction zone for the purpose of producing an effluent product rich in pentane and hexane isomers. For example, isopentane has a clear research octane rating of 93, while 2,2-dimethylbutane has a rating of 92 and 2,3-dimethylbutane a rating of 104; the average pool research octane rating of the mono-methylpentanes is 74. Since the selectivity of conversion in an isomerization reaction zone is virtually 100.0%, the unleaded gasoline pool can be significantly increased in its clear research octane rating through the production of pentane/hexane isomers without incurring a detrimental volumetric yield loss. When preparing, or separately recovering, the pentane/hexane concentrate, good practice dictates including methylcyclopentane which is isomerized to cyclohexane which is subsequently converted to benzene in the reforming reaction zone.

As indicated in U.S. Pat. 3,131,235 (Cl. 260–683.3), the isomerization process is effected in a fixed-bed system utilizing a catalytic composite of a refractory inorganic oxide carrier material, a Group VIII noble metal component and combined halogen, preferably selected from fluorine and chlorine. The refractory inorganic oxide carrier material may be selected from the group including alumina, silica, titania, zirconia, mixtures of two or more, and various naturally-occurring refractory inorganic oxides. Of these, a synthetically-prepared gamma-alumina is preferred. The Group VIII noble metal is generally present in an amount of about 0.01% to about 2.0% by weight, and may be one or more metals selected from the group of ruthenium, rhodium, osmium, iridium, and particularly platinum or palladium. The amount of combined halogen will be varied from about 0.01% to about 8.0% by weight. Both fluorine and chlorine may be used to supply the combined halogen, although the use only of fluorine in an amount of 2.5% to about 5.0% by weight is preferred.

The isomerization reaction is preferably effected in a hydrogen atmosphere utilizing sufficient hydrogen so that the hydrogen to hydrocarbon mole ratio to the reaction zone will be within the range of about 0.25 to about 10.0. Operating conditions will additionally include temperatures ranging from about 200° F. to about 800° F., although temperatures within the more limited range of about 300° F. to about 525° F. will generally be utilized. The pressure, under which the reaction zone is maintained, will range from about 50 to about 1,500 p.s.i.g. The reaction products are separated from the hydrogen, which is recycled, and subjected to fractionation and separation to produce the desired reaction product. Recovered starting material is also recycled so that the overall process yield is high. The liquid hourly space velocity will be maintained in the range of about 0.25 to about 10.0, and preferably within the range of about 0.5 to about 5.0. Another suitable isomerization process is that described in U.S. Pat. 2,924,628 (Cl. 260–666).

DEHYDROGENATION REACTION ZONE

As hereinbefore set forth, at least a portion of the isobutane-rich effluent from the I-cracking reaction zone may be subjected to dehydrogenation to produce the olefinic required for alkylation within the alkylation reaction zone. In another embodiment, at least a portion of the propane/butane concentrate recovered from the catalytic reforming reaction zone effluent may also be subjected to dehydrogenation. The advisability of the utilization of either, or both techniques will be primarily dependent upon the availability of outside olefins; for example, from a catalytic or thermal cracking unit.

When dehydrogenation is deemed desirable, it may be effected essentially as set forth in U.S. Pat. 3,293,219 (Cl. 260–683.3). Briefly, dehydrogenation reactions are generally effected at conditions including a temperature in the range of from 400° C. to about 700° C., a pressure from about atmospheric to about 100 p.s.i.g., a liquid hourly space velocity within the range of about 1.0 to about 40.0 and in the presence of hydrogen in an amount to result in a mole ratio of from 1.0:1.0 to about 10.0:1.0, based upon the paraffinic charge.

The dehydrogenation catalyst is a composite of an inorganic oxide carrier material, an alkali metal component, a Group VIII metal component and a catalytic attenuator from the group consisting of arsenic, antimony and bismuth. A particularly preferred catalyst comprises lithiated alumina containing from 0.05% to about 5.0% by weight of a Group VIII noble metal, especially platinum. The catalytic attenuator is employed in an amount based upon the concentration of Group VIII noble metal components. For example, arsenic is present in an atomic ratio of arsenic and platinum in the range of about 0.20 to about 0.45. Although lithium is the preferred alkalinous metal component, the catalyst may contain calcium, magnesium, strontium, cesium, rubidium, potassium, sodium, and mixtures thereof, etc.

The dehydrogenation conditions and catalysts are selected to result in a relatively low conversion per pass, accompanied by relatively high selectivity to the desired olefinic hydrocarbons. Thus, while the conversion per pass might range from about 10.0% to about 35.0%, the selectivity of conversion will range from about 93.0% to about 97.0% or higher. In view of the fact that the alkylation reactions are effected with a molar excess of paraffins over olefinic hydrocarbons, the high selectivity and relatively low conversion in the dehydrogenation zone are advantageous.

DESCRIPTION OF DRAWING

The inventive concept, encompassed by the present process, and a particularly preferred embodiment, are illustrated in the accompanying drawing. The illustration is presented by way of simplified block-type flow diagram in which each block represents one particular stage, or unit of the process. In order to provide a clear understanding of the invention, a single-column fractionator 4 has been incorporated. Understood is the fact that each zone, or reaction system has, as an integral part thereof, a separation facility designed to recover the various indicated streams.

Miscellaneous appurtenances, not believed necessary for a completely clear understanding of the present process, have been eliminated. The use of details such as pumps, compressors, instrumentation and controls, heat-recovery circuits, miscellaneous valving, start-up lines and similar hardware, etc., is well within the purview of those skilled in the petroleum refining art. Similarly, with respect to the flow of materials throughout the system, only those major streams required to illustrate the interconnection and interaction of the various zones are presented. Thus, various recycle lines and vent gas streams have also been eliminated.

The basic inventive concept is illustrated by I-cracking zone 2, fractionator 4, catalytic reforming zone 12 and extraction zone 14. Other reaction zones, and their interconnection form a particularly preferred embodiment for the maximum production of unleaded gasoline pool of high octane rating.

With reference now to the drawing, it will be described in conjunction with a commercially-scaled unit designed to process a principally heptane-plus straight-run heavy naphtha fraction which had previously been subjected to a hydrorefining technique for contaminant removal and olefin saturation. Pertinent properties of the naphtha fraction are presented in the following Table IV.

TABLE IV

Charge stock properties

| | |
|---|---|
| Gravity, ° API | 55.4 |
| Ave. molecular weight | 113 |
| ASTM distillation, ° F.: | |
|     Initial | 216 |
|     5% | 226 |
|     10% | 230 |
|     30% | 246 |
|     50% | 264 |
|     70% | 286 |
|     90% | 317 |
|     95% | 327 |
|     End point | 364 |

The heavy naphtha charge stock enters the process via line 1, and is introduced thereby into I-cracking zone 2. The catalytic composite, disposed in zone 2, constitutes alumina, 5.0% by weight of nickel and 7.5% by weight of aluminum chloride, sublimed thereon to react with the alumina to form the group hereinbefore described. Operating conditions include a pressure of about 500 p.s.i.g., a maximum catalyst bed temperature of about 400° F., a liquid hourly space velocity of 2.0 and a hydrogen to hydrocarbon mol ratio of about 4.0:1.0.

As previously set forth, one of the unique advantages of the I-cracking system resides in the retention of cyclic hydrocarbons. Although aromatic hydrocarbons may be saturated to naphthenes, virtually no ring-opening is effected. In the instant situation, the heavy naphtha originally contained 47.0% by weight of paraffins, 42.3% by weight of naphthenes and 10.7% by weight of aromatics.

A component analysis of the product effluent indicated a cyclic retention of 100.34 mol percent. Hydrogen consumption in the I-cracking zone is 1.20% by weight, based upon the naphtha charge stock. Hydrocracking yields and product distribution are presented in the following Table V.

TABLE V.—HYDROCRACKING YIELDS AND DISTRIBUTION

| Component | Weight percent | Volume percent | Barrel/ day |
|---|---|---|---|
| Hydrogen | (1.20) | | |
| Methane | 0.01 | | |
| Ethane | 0.02 | | |
| Propane | 1.40 | 1.67 | 1,679 |
| I-butane | 17.91 | 24.00 | 24,000 |
| N-butane | 1.56 | 2.03 | 2,030 |
| I-pentane | 10.43 | 12.62 | 12,620 |
| N-pentane | 1.15 | 1.38 | 1,380 |
| I-hexane | 4.85 | 5.58 | 5,580 |
| N-hexane | 0.92 | 1.05 | 1,050 |
| Heptane-plus | 62.95 | 63.00 | 63,000 |
| Totals | 100.00 | 111.33 | 111,330 |

The hydrocracked effluent is withdrawn by way of line 3, and introduced into fractionation system 4. Propane and lighter gaseous material is removed through line 5, butanes through line 6, isopentane via line 7 (through which it is sent directly to the unleaded gasoline pool 24), normal pentane through line 8, isohexane via line 9 (through which it is sent to gasoline pool 24), normal hexane, including methylcyclopentane, through line 10 and the heptane-plus (including benzene) through line 11.

The 63,000 bbl./day of heptane-plus material is introduced into catalytic reforming zone 12. The reforming reactions are effected at a pressure of about 500 p.s.i.g., a temperature of about 1,000° F., a liquid hourly space velocity of 1.0 and a hydrogen/hydrocarbon mole ratio of 7.0:1.0. The catalytic composite constitutes an alumina carrier material containing 0.55% by weight of platinum, 0.20% by weight of rhenium and 0.87% by weight of combined chloride, all of which are computed on an elemental basis. Reforming yields and product distribution are presented in the following Table VI.

TABLE VI.—REFORMING YIELDS AND DISTRIBUTION

| Component | Weight percent | Volume percent | Barrel/ day |
|---|---|---|---|
| Hydrogen | 4.64 | | |
| Methane | 0.81 | | |
| Ethane | 1.18 | | |
| Propane | 1.69 | 2.52 | 1,588 |
| I-butane | 0.98 | 1.31 | 825 |
| N-butane | 1.48 | 1.91 | 1,203 |
| I-pentane | 1.87 | 2.26 | 1,424 |
| N-pentane | 1.26 | 1.51 | 951 |
| I-hexane | 3.22 | 3.67 | 2,312 |
| N-hexane | 1.60 | 1.82 | 1,147 |
| Aromatics | 77.70 | 67.29 | 42,393 |
| Heptane-plus | 3.57 | 3.57 | 2,249 |
| Totals | 100.00 | 85.86 | 54,092 |

The yields presented in Table VI are based upon the 63,000 bbl./day of heptane-plus hydrocracked effluent charged to the reforming reaction zone. Catalytic reforming is, of course, a hydrogen-producing process, and the 4.64% by weight of hydrogen may be utilized in the I-cracking zone to supplement the hydrogen consumed therein.

Although the entire reformed effluent may be sent via line 13 into extraction zone 14, a preferred technique involves subjecting only the heptane-plus portion to solvent extraction, the hexane-minus material being introduced into fractionator 4 for separation therein as previously described. The extraction zone charge is introduced into a lower portion of a solvent extraction column countercurrently to a lean solvent stream which is introduced into an upper portion of said column, the mole ratio of solvent to hydrocarbon being about 3.2:1.0. The selected solvent is sulfolane, and the extraction column functions at a top pressure of about 15.0 p.s.i.g. and a reboiler temperature of about 320° F. A saturate-rich raffinate stream is withdrawn as an overhead product, while the rich solvent bottoms stream is introduced into an extractive distillation zone. Additional raffinate is withdrawn as an overhead stream, combined with the saturate-rich raffinate from the extraction column, a total of 2,249 bbl./day, and passed through line 16 into I-cracking zone 2. Rich solvent is introduced into a solvent recovery system functioning at sufficiently low pressures and high temperatures to drive aromatic hydrocarbons overhead while producing a lean solvent bottoms stream for recycle to the extraction column. The aromatic concentrate, in an amount of 42,393 bbl./day is withdrawn from extraction zone 14 via line 15, and sent thereby into gasoline pool 24. With respect to the raffinate stream in line 16, beneficial results are obtained, relative to the subsequent I-cracking reactions, when the stream is substantially free from the selected solvent. One suitable technique, for removing solvent from the raffinate stream in line 16, is that disclosed in U.S. Pat. No. 3,470,087 (Cl. 208—321).

With respect to the 2,249 bbl./day of raffinate recycle in line 16, additional isobutane and aromatics are produced therefrom in reaction zones 2 and 12. These additional yields are presented in the following Table VII.

TABLE VII.—CONVERTED RAFFINATE YIELDS

| Component | Volume percent | Barrels/ day |
|---|---|---|
| Propane | 31.71 | 713 |
| I-butane | 50.68 | 1,140 |
| N-butane | 5.46 | 123 |
| I-pentane | 1.02 | 23 |
| N-pentane | 0.34 | 8 |
| Aromatics | 30.78 | 692 |

The following Table VIII summarizes the volumetric yields presented in the foregoing Tables V, VI, and VII.

TABLE VIII.—YIELD SUMMARY, I-CRACKING PLUS REFORMING

| Component | Volume percent | Barrels/ day |
|---|---|---|
| Propane | 3.97 | 3,971 |
| I-butane | 25.96 | 25,965 |
| N-butane | 3.36 | 3,356 |
| I-pentane | 14.07 | 14,067 |
| N-pentane | 2.34 | 2,339 |
| I-hexane | 7.89 | 7,894 |
| N-hexane | 2.20 | 2,197 |
| Aromatics | 43.08 | 43,085 |
| Totals | 102.87 | 102,874 |

As indicated in Table VIII, about 69.0% of the desired aromatic concentrate and isobutane were recovered. The aromatic concentrate has a research octane rating of 115.0 and, when blended with the total pentanes and hexanes will produce a gasoline pool of the character shown in Table IX. The isohexane fraction has been broken down to show the quantities of 2,2-dimethylbutane, 2,3-dimethylbutane, 3-methylpentane and 2-methylpentane.

TABLE IX.—CLEAR GASOLINE POOL, CASE I

| Component | Barrel/day | Volume percent | Research octane |
|---|---|---|---|
| Isopentane | 14,067 | 20.22 | 93.0 |
| N-pentane | 2,339 | 3.36 | 62.0 |
| 2,2-DiMeBu | 780 | 1.12 | 92.0 |
| 2,3-DiMeBu | 906 | 1.30 | 104.0 |
| 2-MePe | 3,863 | 5.55 | 74.0 |
| 3-MePe | 2,345 | 3.37 | 74.0 |
| N-hexane | 2,197 | 3.16 | 25.0 |
| Aromatic gasoline | 43,085 | 61.92 | 115.0 |
| Totals | 69,582 | 100.00 | 101.9 |

The 3,971 bbl./day of propane can be subjected to dehydrogenation to produce propylene which can then be converted by hydrolysis into isopropyl alcohol having a clear research octane rating of about 110 to about 120. This, of course, further increases both the yield and octane rating of the unleaded gasoline pool. On the other hand, the propylene could be employed in an alkylation reaction zone for the production of $C_3$-alkylate having a clear research octane rating of 92.0.

In a preferred utilization of the present inventive concept, an alkylation zone and an isomerization zone are added to form aklylate from the isobutane and pentane/hexane isomers from the normal pentane/hexane concentrate.

Normal pentane and hexane are withdrawn from fractionation system 4 by way of lines 8 and 10, respectively, and are introduced into isomerization reaction zone 22. Isomerization zone 22 utilizes a fixed-bed of a catalytic composite of alumina, about 4.0% by weight of combined fluorine and 0.375% by weight of platinum, calculated as the elemental metal. The reactions are effected at a pressure of about 1,000 p.s.i.g., a temperature of about 300° F. and a hydrogen to hydrocarbon molal ratio of about 1.0:1.0; the reactants traverse the catalyst bed at a liquid hourly space velocity of about 2.0. Conversion to isomers is about 99.0% efficient and with the volumetric increase due to molecular size, and conversion of some hexane to isopentane, 2,377 bbl./day of isopentane, 749 bbl./day of 2,2-dimethylbutane, 240 bbl./day of 2,3-dimethylbutane, 712 bbl./day of 2-methylpentane and 409 bbl./day of 3-methylpentane are produced and are sent to the unleaded gasoline pool via line 23, fractionator 4 and lines 7 and 9.

As illustrated in the drawing, and as hereinbefore discussed, the butane concentrate in line 6 may be subjected to dehydrogenation in zone 17 to provide the olefin-containing charge in line 18, to alkylation reaction zone 19. In the instant situation, sufficient outside butylenes, from a fluid catalytic cracking unit, are available, and are introduced into alkylation zone 19.

Alkylation zone 19 is a hydrofluoric acid system into which 22,578 bbl./day of outside butylenes are introduced to produce 39,963 bbl./day of $C_4$-alklate having an octane rating of about 97.0. The reaction time, utilizing a pumped acid settler reactor, is about nine minutes, and the acid to hydrocarbon ratio is about 1.5:1.0. The alkylation reactions are effected at a temperature of about 100° F. and a pressure of about 20 atmospheres. Following separation of unreacted isobutanes, which are recycled, the alkylate gasoline passes through line 20 into unleaded gasoline pool 24.

One preferred technique constitutes introducing the 3,356 bbl./day of butane into the isomerization zone 22, by way of line 21, for conversion therein into isobutane which is also alkylated in alkylation zone 14. At a conversion efficiency of 99.0%, and with the volumetric increase due to molecular size, an additional 3,470 bbl./day of isobutane becomes available. In this situation, 3,010 bbl./day of additional outside butylenes are required to produce an additional 5,245 bbl./day of $C_4$-alkylate.

The unleaded clear gasoline pool, including the 3,356 bbl./day of butanes which are unreacted in the alkylation reaction zone, has the characteristics shown in the following Table X.

TABLE X.—CLEAR GASOLINE POOL, CASE II

| Component | Barrel/day | Volume percent | Research octane |
|---|---|---|---|
| N-butane | 3,356 | 2.97 | 94.0 |
| Isopentane | 16,444 | 14.57 | 93.0 |
| 2,2-DiMeBu | 1,529 | 1.35 | 92.0 |
| 2,3-DiMeBu | 1,146 | 1.02 | 104.0 |
| 2-MePe | 4,575 | 4.05 | 74.0 |
| 3-MePe | 2,754 | 2.44 | 74.0 |
| $C_4$-alkylate | 39,963 | 35.41 | 97.0 |
| Aromatic gasoline | 43,085 | 38.19 | 115.0 |
| Totals | 112,852 | 100.00 | 101.7 |

Based upon the 100,000 bbl./day of fresh feed and the additional 22,578 bbl./day of outside butylenes, the volumetric yield of the gasoline pool, having a clear research octane of 101.7, is 92.1%.

The foregoing demonstrates the method by which the present invention is effected and the benefits afforded through the utilization thereof.

I claim as my invention:

1. A process for the simultaneous production of an aromatic concentrate and isobutane, from a naphtha boiling range charge stock, which process comprises the steps of:
   (a) reacting said charge stock with hydrogen, in a hydrocracking reaction zone, at hydrocracking conditions and in contact with a hydrocracking catalytic composite of a Group VIII noble metal component and the reaction product of alumina and a sublimed Friedel-Crafts metal halide;
   (b) separating the resulting hydrocracked product effluent, in a first separation zone, to recover said isobutane and to provide a heptane-plus concentrate;
   (c) reacting said heptane-plus concentrate, in a catalytic reforming zone, at reforming conditions selected to convert naphthenic hydrocarbons to aromatic hydrocarbons;
   (d) separating the resulting reformed product effluent, in a second separation zone, to recover said aromatic hydrocarbons and to provide a saturated paraffinic stream; and
   (e) introducing at least a portion of said saturated paraffinic stream into said hydrocracking reaction zone.

2. The process of claim 1 further characterized in that said hydrocracking conditions include a maximum catalyst bed temperature of from 300° F. to about 650° F.

3. The process of claim 1 further characterized in that said hydrocracking catalytic composite comprises from 0.01% to about 2.0% by weight of a platinum or palladium component.

4. The process of claim 1 further characterized in that said Friedel-Crafts metal halide is an aluminum halide.

References Cited
UNITED STATES PATENTS

| | | | |
|---|---|---|---|
| 3,003,949 | 10/1961 | Hamilton | 208—79 |
| 3,182,013 | 5/1965 | Myers | 208—112 |
| 3,235,485 | 2/1966 | Kay et al. | 208—60 |
| 3,530,060 | 9/1970 | Offenhauer | 208—60 |
| 3,630,885 | 12/1971 | Egan | 208—59 |
| 3,658,690 | 4/1972 | Graven | 208—62 |
| 3,692,666 | 9/1972 | Pollitzer | 208—112 |

DELBERT E. GANTZ, Primary Examiner

S. L. BERGER, Assistant Examiner

U.S. Cl. X.R.

260—676 R